(12) United States Patent
Cockerum

(10) Patent No.: US 7,291,354 B2
(45) Date of Patent: Nov. 6, 2007

(54) PRODUCT AND PROCESS OF FORMING A FOOD PRODUCT

(76) Inventor: Forrest Luther ("Skip") Cockerum, 2 Elm Ave., Tillamook, OR (US) 97141

( * ) Notice: Subject to any disclaimer, the term of this patent is extended or adjusted under 35 U.S.C. 154(b) by 742 days.

(21) Appl. No.: 10/746,773

(22) Filed: Dec. 23, 2003

(65) Prior Publication Data

US 2004/0151818 A1   Aug. 5, 2004

Related U.S. Application Data

(60) Provisional application No. 60/436,610, filed on Dec. 27, 2002.

(51) Int. Cl.
*A23K 1/18* (2006.01)
*A23L 1/18* (2006.01)
(52) U.S. Cl. .................. 426/2; 426/1; 426/89; 426/621
(58) Field of Classification Search .............. 426/1, 426/2, 621, 89
See application file for complete search history.

(56) References Cited

U.S. PATENT DOCUMENTS 3,784,716 A * 1/1974 Spangler ................ 426/289
4,393,087 A   7/1983 Sullins et al.
4,640,842 A   2/1987 May
4,755,390 A * 7/1988 Calandro et al. ........... 426/293
4,847,103 A   7/1989 Saita et al.
5,846,584 A   12/1998 Capodieci
6,143,336 A   11/2000 Capodieci
6,403,132 B1  6/2002 Capodieci

FOREIGN PATENT DOCUMENTS

JP    06105656 A   *   4/1994
WO    WO0056173   *   9/2000

* cited by examiner

*Primary Examiner*—C. Sayala
(74) *Attorney, Agent, or Firm*—Ingrid McTaggart

(57) ABSTRACT

One method of forming a food product comprises placing a puffed grain in a blending container, placing a fluidized nutrient in the blending container, blending the puffed grain and the fluidized nutrient to form a puffed product, and dehydrating the puffed product to form a de-puffed food product.

6 Claims, 2 Drawing Sheets

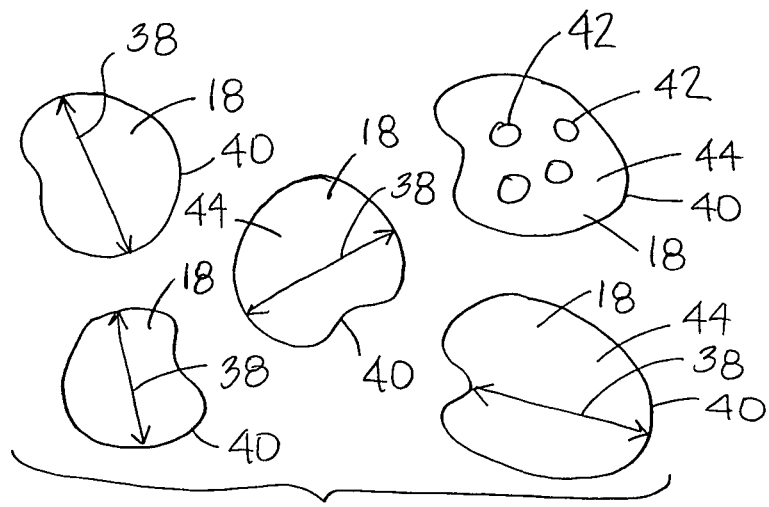
FIG. 3
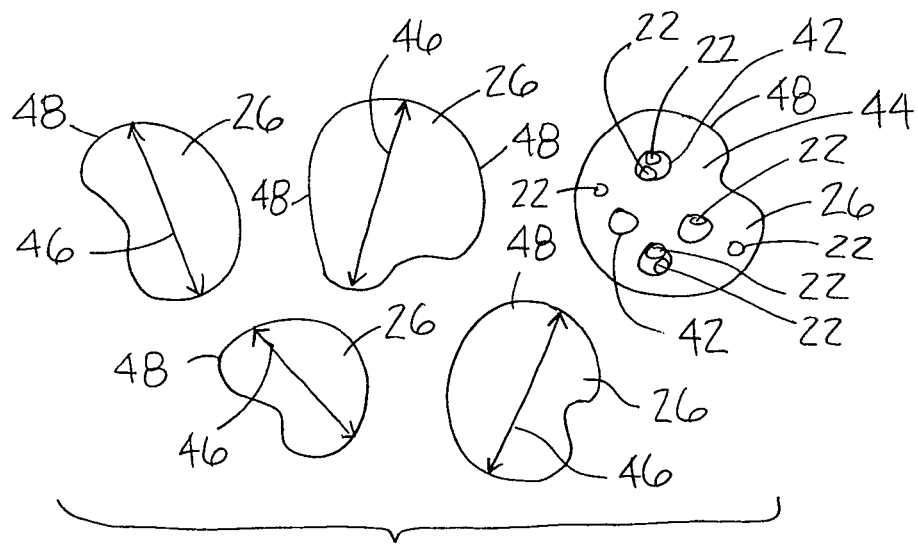
FIG. 4
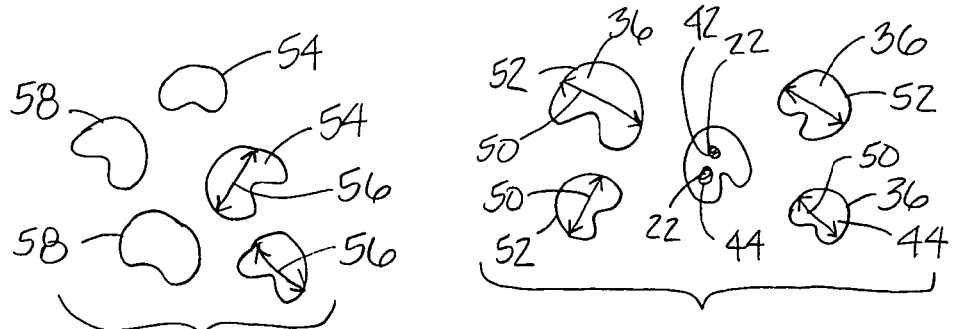
FIG. 6
FIG. 5

PRODUCT AND PROCESS OF FORMING A FOOD PRODUCT

This application claims priority on the provisional patent application Ser. No. 60/436,610, filed on Dec. 27, 2002, in the name of Forrest Luther Cockerum, and titled "PROCESS FOR UTILIZING 'PUFFED' GRAINS AS A CARRIER OR BASE FOR LIQUIFIED ANIMAL FOOD INGREDIENTS AND/OR SUPPLEMENTS."

BACKGROUND

Food products are generally consumed by animals and humans alike. Increasing the nutritional value of food products may enhance the value of the food product and the health of the consumer.

Therefore, for these and other reasons there is a need for the present invention.

SUMMARY

One method of forming a food product may comprise placing a puffed grain in a blending container, placing a fluidized nutrient in the blending container, blending the puffed grain and the fluidized nutrient to form a puffed product, and dehydrating the puffed product to form a de-puffed food product.

BRIEF DESCRIPTION OF THE DRAWINGS

FIG. 3 is a front view of puffed grain.

FIG. 4 is a front view of puffed grain having a food supplement incorporated therein.

FIG. 5 is a front view of a food product comprising a de-puffed grain having food supplement incorporated therein.

FIG. 6 shows a pre-puffed grain.

DETAILED DESCRIPTION OF THE DRAWINGS

Figure 1:
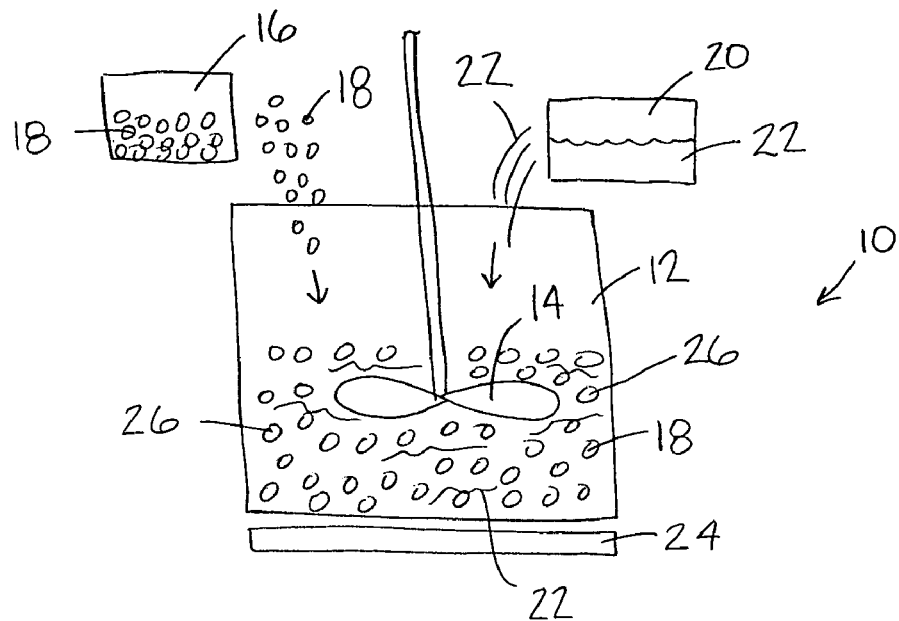
FIG. 1 is a schematic view of one embodiment of a blending system for forming a food product.

FIG. 1 is a schematic view of one embodiment of a blending system for forming a food product. In particular, blending system 10 includes a blending container 12 which may include a stirring blade 14 positioned therein. Blade 14 may be powered by any power device (not shown) sufficient to blend ingredients held within container 12. A grain container 16 may hold puffed grain 18 which may be added to container 12 by any applicable method. A supplement container 20 may hold food supplement 22 which may be added to container 12 by any applicable method. In the embodiment shown, puffed grain 18 comprises puffed rice. However, puffed grain 18 may comprise any puffed grain such as corn, wheat, oats, rye, sorghum, triticale, rice and millet, and any mixtures thereof. In the embodiment shown, food supplement 22 comprises homogenized fly larvae. However, food supplement 22 may comprise any food nutrient such as homogenized insect larvae, wherein the insect larvae may be chosen from the group consisting of fly, cricket, mealworm, wax moth, silk worm, termite, wasp and ant, and any mixtures thereof. In the embodiments wherein food supplement 22 comprises homogenized insect larvae, the food product produced by the process of the present invention may be utilized as a wild bird feed, a caged bird feed, or as fish food. In other embodiments, food supplement 22 may comprise a fluidized meat protein, such as shrimp, beef, lamb, pork, goat, fish, and shellfish meat, and any mixtures thereof. In the embodiments wherein food supplement 22 comprises fluidized meat protein, the food product produced by the process of the present invention may be utilized as a food for human consumption. By way of example, in an embodiment wherein the food product produced by the method of the present invention is utilized for human consumption, the food product may be incorporated into a stuffing, a pasta, a soup or the like. The food product produced by the present invention may be utilized as a stand-alone food by itself, or the food product may be incorporated into a food as one component of the food. In still other embodiments, food supplement 22 may comprise a carbohydrate, a fat, a vitamin or a mineral, or any mixture thereof.

Blending container 12 may be positioned adjacent a heating element 24 that may be utilized to dry or dehydrate puffed product 26 contained within blending container 12. In other embodiments, other methods of drying or dehydrating material 26 may be utilized, such as a drying rack (not shown), or a drying conveyor belt (not shown).

Figure 2:
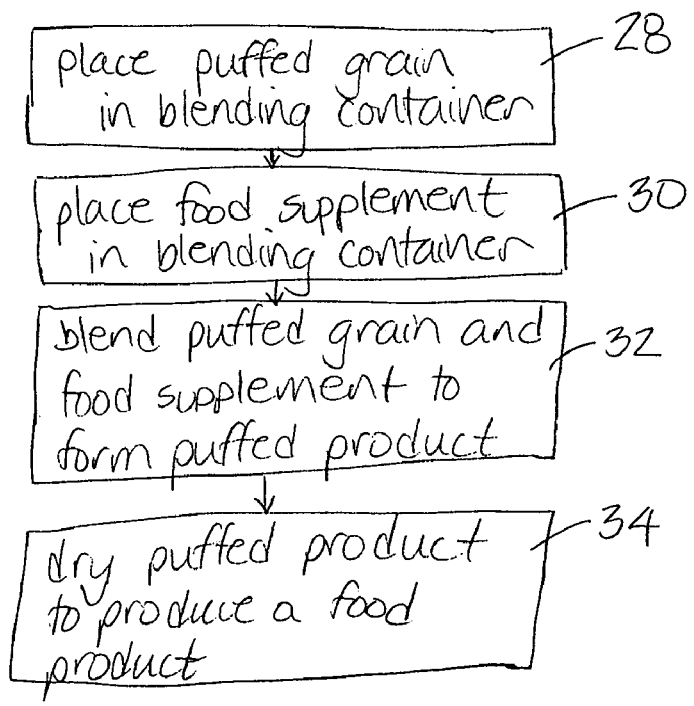
FIG. 2 is a flowchart of one embodiment of a process of forming a food product.

FIG. 2 is a flowchart of one embodiment of a process of forming a food product. In a first step 28 puffed grain 18 may be placed in blending container 12. As discussed with respect to FIG. 1, puffed grain 18 may be poured from container 16 into container 12, though any means of placing puffed grain 18 into container 12 may be utilized. Puffed grain 18 may be manufactured by rapidly heating a pre-puffed grain material (see FIG. 6) to cause the water content of the grain to expand and release from the grain, so as to form hollow pores (see FIG. 3) (causing the puffed grain to be porous), increase its volume (causing the puffed grain to have a larger diameter and circumference than the un-puffed or pre-puffed grain), and to harden the grain tissue (causing the puffed grain to be crisp).

In a second step 30 food supplement 22 may be placed in blending container 12. As discussed with respect to FIG. 1, food supplement 22 may be fluidized such that it may be poured from container 20 into container 12, though any means of placing food supplement 22 into container 12 may be utilized. Food supplement 22 may be prepared by grinding a nutrient to a ground nutrient having a predetermined size, and then blending the ground nutrient with moisture, such as water, to form a fluidized nutrient or food supplement 22.

In a third step 32 the puffed grain 18 and the food supplement 22 are blended together. The blending step may comprise mixing of puffed grain 18 and food supplement 22 through use of stirring blade 14. In another embodiment, blending step 32 may comprise spraying liquified food supplement 22 onto puffed grain 18, though any blending method may be utilized as is appropriate. Blending step 32 may result in food supplement 22 being incorporated into the pores (see FIG. 3) and onto the outer surface (see FIG. 3) of puffed grain 18. In one embodiment, a sufficient amount of food supplement 22, such as fluidized protein 22, is provided such that in blending step 32 puffed grain 18 is saturated with food supplement 22. Blending of puffed grain 18 and food supplement 22 will result in puffed product 26.

In a fourth step 34 puffed product 26 is dried or dehydrated to produce a food product 36 (see FIG. 5). This dehydration step may also be referred to as shrinking, de-puffing, or collapsing puffed product 26 to produce food product 36. The puffed product, therefore, is only an intermediary in the process of the present invention and is not the final product. The resulting collapsed product of the drying step may be referred to a "collapsed puffed product," meaning a collapsed product was formed from a puffed product. Puffed product 26 may be dried by use of heating element 24, positioned below blending container 12. In other embodiments, puffed product 26 may be moved from blending container 12 to a dehydrator or a drying rack after blending in container 12.

Puffed grain 18 may comprise any weight percent of moisture, such as water, prior to the blending step. For example, puffed grain 18 may comprise 50 weight percent moisture when added to blending container 12. Food supplement 22 may be in liquified form when added to blending container 12 prior to the blending step. Puffed product 26, produced by the blending of puffed grain 18 and food supplement 22, may have a large weight percent of moisture, such as in the range of 25 to 95 weight percent moisture. Drying of puffed product 26 will reduce the moisture content of the puffed product such that food product 36 (see FIG. 5) has a moisture content that is lower than the moisture content of puffed product 26. In one embodiment, the moisture content of food product 36 may be 5 weight percent or less, and may even be less than 3 weight percent. Drying of puffed product 26 to form food product 36 may result in a very dry food product that may have a long "shelf life," i.e., preservatives may not be required for food product 36 to be stored on a shelf for several months or longer.

FIGS. 3-5 show, respectively, a front view of puffed grain, a front view of puffed grain having a food supplement incorporated therein, and a front view of food product comprising a de-puffed grain having a food supplement incorporated therein. Puffed grain 18, shown in FIG. 3, may have an average width 38, i.e., an average of the individual widths 38 of the individual puffed grains. Puffed grain 18 may also have an average circumference 40, i.e., an average of the individual circumferences 40 of the individual puffed grains. Puffed grain 18 may also have an average moisture content, i.e., an average of the individual moisture contents of the individual puffed grains. Individual ones of the puffed grains 18 may include pores 42, also referred to as cavities 42, (shown greatly enlarged on one of the puffed grains for ease of illustration) and an outer surface 44.

Puffed product 26, shown in FIG. 4, may have an average width 46, i.e., an average of the individual widths 46 of the individual grains of the puffed product. Puffed product 26 may also have an average circumference 48, i.e., an average of the individual circumferences 48 of the individual grains of the puffed product. Puffed product 26 may also have an average moisture content, i.e., an average of the individual moisture contents of the individual grains of the puffed product. Puffed product 26, after the blending of food supplement 22 therewith, may include food supplement 22 incorporated into pores 42 (shown greatly enlarged on one of the puffed grains for ease of illustration) and onto outer surface 44 of the individual ones of grains of puffed product 26.

Food product 36, shown in FIG. 4, may have an average width 50, i.e., an average of the individual widths 50 of the individual grains of the food product. Food product 36 may also have an average circumference 52, i.e., an average of the individual circumferences 52 of the individual grains of the food product. Food product 36 may also have an average moisture content, i.e., an average of the individual moisture contents of the individual grains of the food product. Food product 36, after shrinking or collapsing during the dehydration step of the process of the present invention, will still retain food supplement 22 within pores 42 of the individual grains of food product 36. However, pores 42, along with the overall size of food product 36, are smaller than the pore, and grain size, of puffed product 26 of FIG. 4.

In one embodiment, the average width 50 of food product 36 is less than 50% of the average width 46 of puffed product 26, i.e., less than ½ the size of puffed product 26. In another embodiment, the average width 50 of food product 36 is less than 25% of the average width 46 of puffed product 26, i.e., less than ¼ the size of puffed product 26.

In one embodiment, the average moisture content of food product 36 is less than 75% of the average moisture content of puffed product 26. In one embodiment, the average moisture content of food product 36 is less than 50% of the average moisture content of puffed product 26. In one embodiment, the average moisture content of food product 36 is less than 25% of the average moisture content of puffed product 26. In one embodiment, the average moisture content of food product 36 is less than five weight percent. In one embodiment, the average moisture content of food product 36 is less than three weight percent. In one embodiment, the moisture content of puffed product 26 may be greater than 70 weight percent.

FIG. 6 shows grain 54 prior to puffing, i.e., an un-puffed grain is shown prior to the process that results in puffed grain 18 (see FIG. 3). Pre-puffed grain 54 may have an average width 56, i.e., an average of the individual widths 56 of the individual pre-puffed grains. Pre-puffed grain 54 may also have an average circumference 58, i.e., an average of the individual circumferences 58 of the individual grains. Pre-puffed grain 54 may also have an average moisture content, i.e., an average of the individual moisture contents of the individual pre-puffed grains.

In one embodiment, the average circumference of puffed product 26 is larger than the average circumference of pre-puffed grain 54. In one embodiment, the average circumference of food product 36 is within 25% of the average circumference of pre-puffed grain 54, i.e., food product 36 has a size from 75% to 125% of the size of un-puffed grain 54. In one embodiment, the average circumference of food product 36 is smaller than the average circumference of puffed product 26.

Grain 18 may include approximately 6% crude, or vegtable, protein. Food product 36, with food protein supplement 22 incorporated therein, may include a combined protein (vegtable and animal protein) in a range from greater than 6% to as high as 50% or more, and typically approximately 18% (approximately 6% crude protein and approximately 12% refined, or animal, protein). Accordingly, food product 36 has a higher percentage of protein than does grain 18, and a higher percentage of refined, or animal, protein than does grain 18. Food product 28, therefore, may have a higher nutritional value than does grain 18. Moreover, birds and fish may be more attracted to a bird or fish food, respectively, that includes such a higher percentage of protein, and includes refined animal protein.

Other enhancements may be made to the product and process described herein wherein such variations and modifications of the concepts described herein fall within the scope of the claims below.

I claim:

1. A method of forming a food product, comprising:
    placing a puffed grain in a blending container;
    placing a fluidized nutrient in said blending container;
    blending said puffed grain and said fluidized nutrient to form a puffed product; and dehydrating said puffed product to form a de-puffed food product, wherein said fluidized nutrient comprises a fluidized protein, and wherein said fluidized protein is chosen from the group consisting of fluidized fly, fluidized cricket, fluidized mealworm, fluidized wax moth, fluidized silk worm, fluidized termite, fluidized wasp, and fluidized ant.

2. A method of forming a food product, comprising:

placing a puffed grain in a blending container;

placing a fluidized nutrient in said blending container;

blending said puffed grain and said fluidized nutrient to form a puffed product; and dehydrating said puffed product to form a de-puffed food product, wherein said fluidized nutrient comprises a fluidized protein, and wherein said fluidized protein is chosen from the group consisting of fluidized shrimp, fluidized beef, fluidized lamb, fluidized pork, fluidized goat, fluidized fish, and fluidized shellfish meat.

3. A process of adding a food supplement to a grain, comprising:

blending a puffed grain and a fluidized food supplement to form a puffed product including said food supplement incorporated therein; and shrinking said puffed product to form a de-puffed final product including said food supplement incorporated therein, wherein said fluidized food supplement is chosen from the group consisting of fluidized fly, fluidized cricket, fluidized mealworm, fluidized wax moth, fluidized silk worm, fluidized termite, fluidized wasp, and fluidized ant.

4. A food product, comprising:

a dehydrated, de-puffed grain having fluidized insect larvae incorporated therein.

5. A food product according to claim 4 wherein said insect larvae comprises fly larvae and wherein said grain comprises rice.

6. A food product according to claim 4 wherein said grain includes cavities therein and an outer surface, and wherein said insect larvae is incorporated into said grain by incorporation into said cavities and onto said outer surface.

* * * * *